| United States Patent [19] | [11] Patent Number: 4,524,535 |
|---|---|
| Bates | [45] Date of Patent: Jun. 25, 1985 |

[54] TROLLING METHOD AND APPARATUS

[75] Inventor: Robert L. Bates, Tucson, Ariz.

[73] Assignee: Agro Land & Cattle Company, Inc., Tucson, Ariz.

[21] Appl. No.: 462,567

[22] Filed: Jan. 31, 1983

[51] Int. Cl.³ .............................................. A01K 79/00
[52] U.S. Cl. ......................................... 43/4.5; 43/6.5; 43/27.4; 43/43.13; 43/42.74; 43/44.84
[58] Field of Search ....................... 43/4, 4.5, 6.5, 27.4, 43/42.74, 43.13, 44.84, 44.85

[56] References Cited

FOREIGN PATENT DOCUMENTS 66759  9/1943  Norway ..................................... 43/4

Primary Examiner—Nicholas P. Godici
Assistant Examiner—Maureen Weikert
Attorney, Agent, or Firm—Cahill, Sutton & Thomas

[57] ABSTRACT

Deep sea trolling apparatus and method employing a multi-jig array capable of being towed by a relatively small vessel. The array comprises a pair of running lines, spacing bars detachably connected to the running lines at spaced locations and adapted to maintain separation of the lines and stability of the array in the water, and jig-carrying branch lines detachably connected to the running lines in the spaces between the spacing bars. Both the spacing bars and branch lines are removable from the running lines as the latter are hauled aboard for removal of the catch. The method further contemplates setting a second array utilizing spacing bars and branch lines removed from a first array as the latter is hauled aboard. Paravanes can be used to shear the arrays beneath the surface of the sea and outwardly of the wake of the vessel.

22 Claims, 12 Drawing Figures

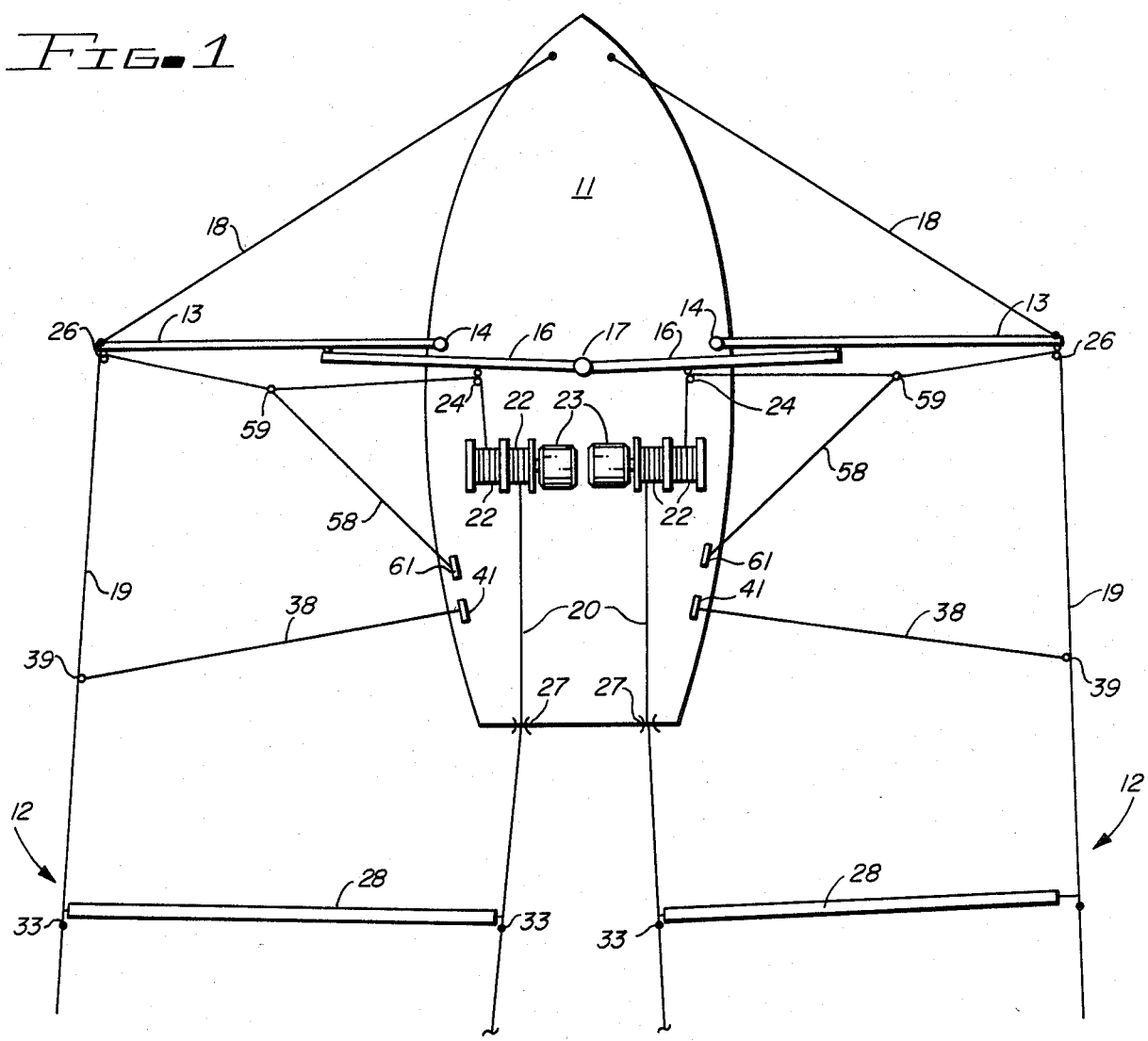
Fig-1
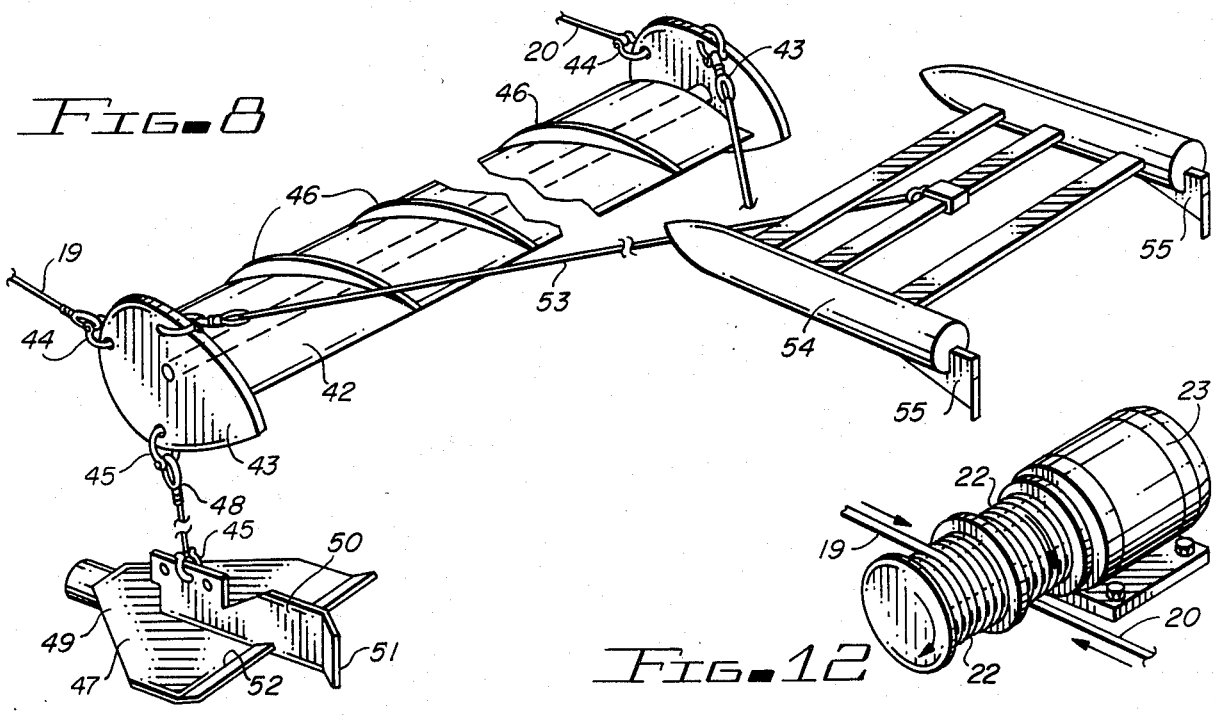
Fig-8
Fig-12

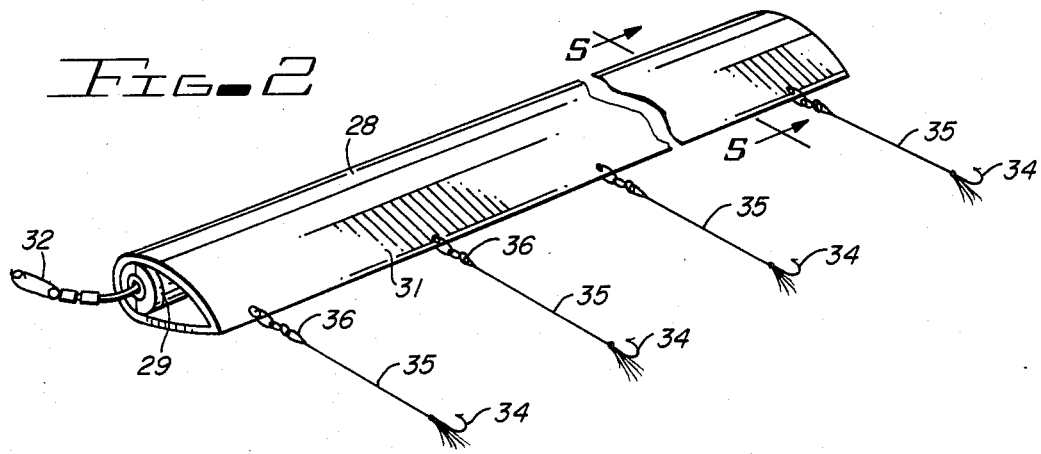
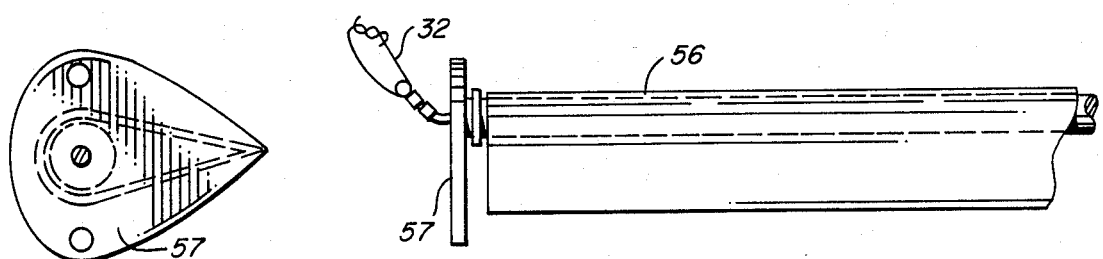
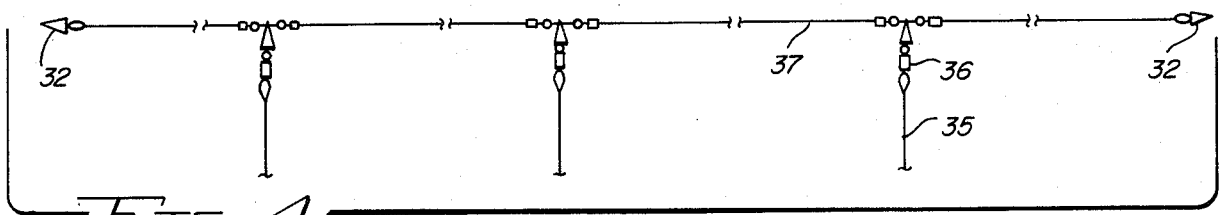
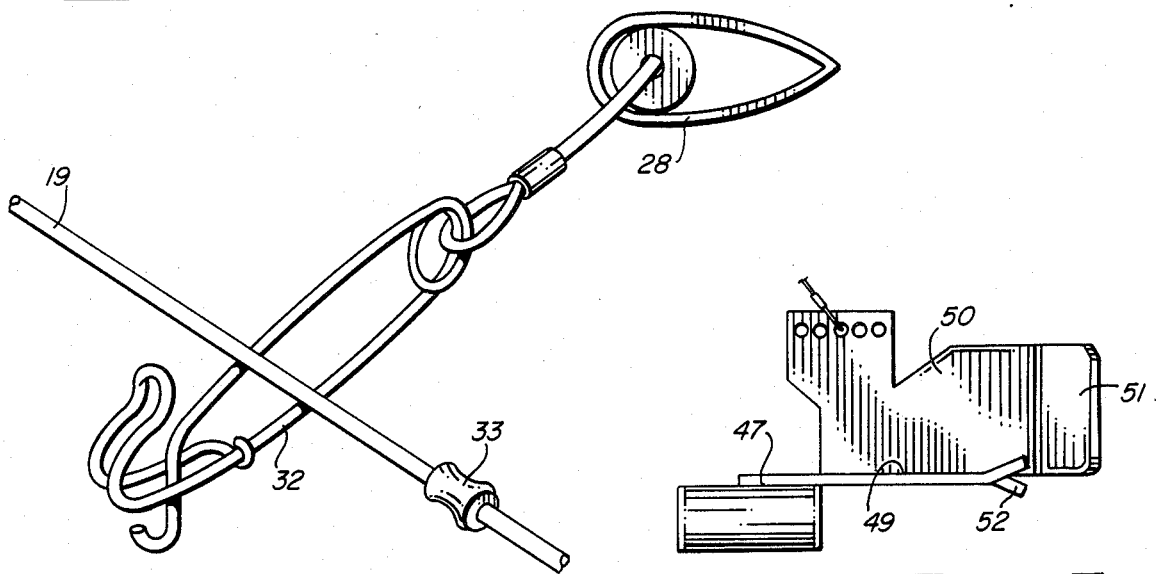

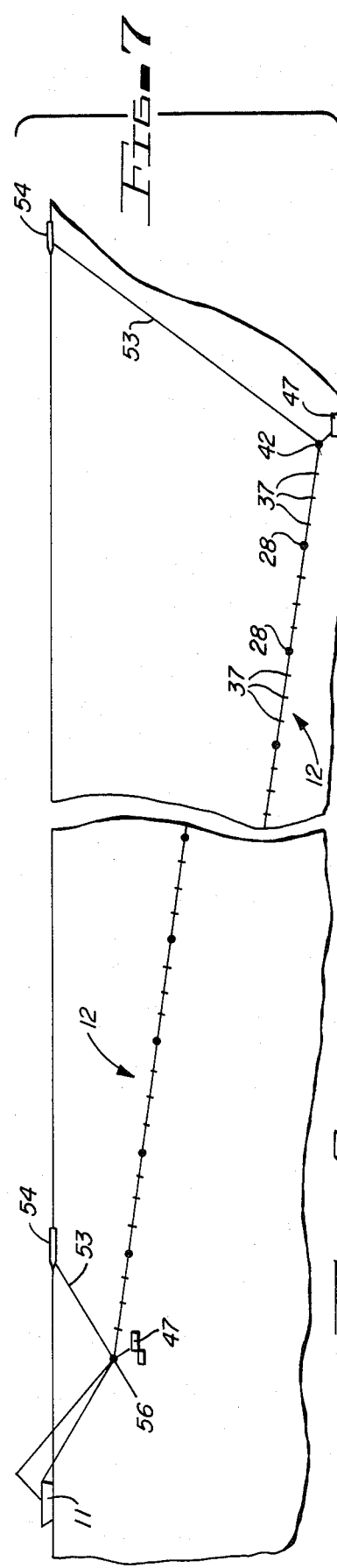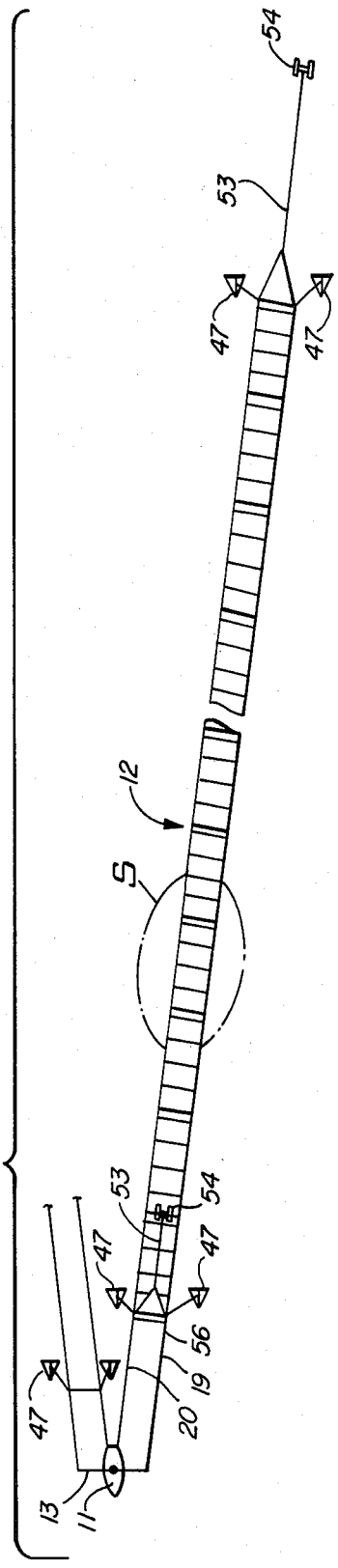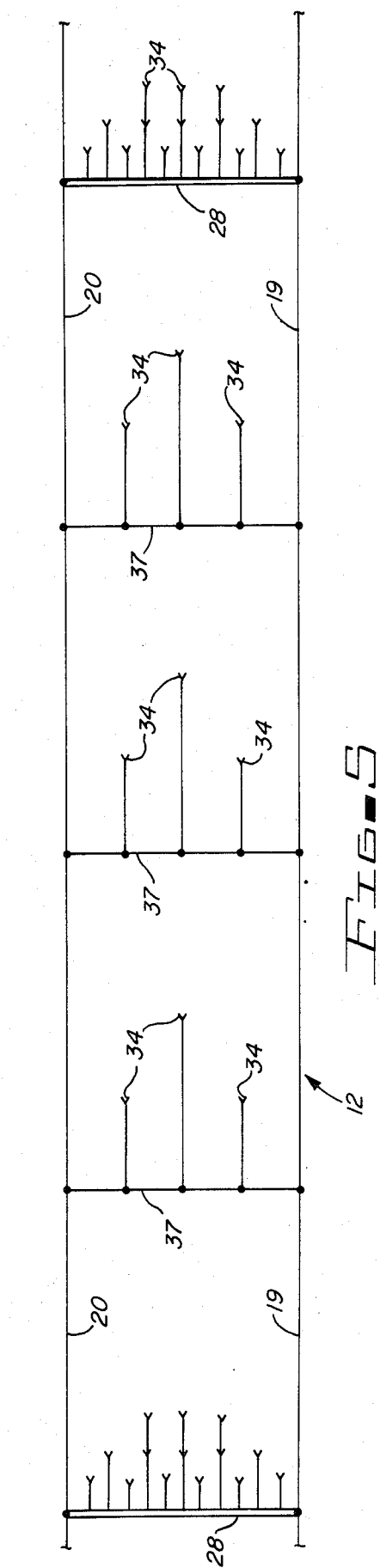

TROLLING METHOD AND APPARATUS

TECHNICAL FIELD

This invention is concerned with a method and apparatus for fishing, particularly commercial deep sea fishing.

BACKGROUND ART

Trolling is one fishing method widely used for catching high value schooling fish such as tuna and mackeral. This method has, in the past, involved setting aft of a slowly moving vessel a plurality of long lines having jigs, or lures, attached thereto at spaced locations along the lines. As the vessel passes through a school of fish, the fish are attracted to and caught by the jigs. The lines are then hauled in to remove the catch.

The following publications describe conventional trolling practices: "Fish Catching Methods of the World", Andres von Brandt, published 1972 by Fishing News (Books), Ltd., London, see pages 50-55; and "Commercial Fishing Methods", John C. Sainsbury, published 1971 by Fishing News (Books), Ltd., London, see pages 114-116. The following U.S. patents also disclose apparatus for trolling: U.S. Pat. No. 3,355,835, granted Dec. 5, 1967 to J. Lyons for "Jig Fishing Apparatus"; and U.S. Pat. No. 3,835,567, granted Sept. 17, 1974 to W. E. Humbert et al., for "Troll Fishing Apparatus".

The commercial fisherman endeavors to catch as many fish as possible and this usually means setting many long lines which then tend to foul each other. If a large vessel is used which can be equipped with lengthy jig poles, or beams, to spread the lines farther apart to prevent fouling, fuel costs for propelling the vessel can reduce the profitability of the endeavor.

The fishing vessels disclosed in the Lyons and Hubert et al. patents mentioned above are of modest size so that only limited spacing can be achieved for the running lines used in trolling. Attempts to increase the trolling array by increasing the number of lines beyond six to eight lines reduces the spacing of the lines and enhances the likelihood that some of the lines will become fouled. A more important consideration with respect to the trolling apparatus disclosed in the Lyons and Hubert et al patents is that the vessels there disclosed, again because of their modest size, are not capable of long voyages at sea in search of valuable pelagic species of fish.

DISCLOSURE OF INVENTION

The method of this invention involves the concept of hauling a large stable trolling array, i.e., an assemblage presenting many jigs for catching fish, behind a small, economically propelled vessel. It is envisioned that the trolling vessels will operate in a fleet which, when not fishing, can be hauled aboard a mother vessel which provides storage for the catch and amenities for the crew not available on the small trolling vessels themselves. The trolling vessels are designed to be in the water around the clock when fishing; returning to the mother ship every twelve hours for a crew change and unloading of catch. Thus, the trolling vessels need provide only limited storage for catch and only minimal comfort facilities for the crew. With the size of the trolling vessel kept to the absolute minimum, a minimum amount of fuel is expended when fishing. The mother ship may idle while the trolling vessels are fishing or searching for fish, thereby not substantially detracting from the economy of the fleet or, if a particularly large school of fish is encountered, the mother ship may fish as well.

The trolling array of the invention comprises a pair of running lines which are trailed astern of the fishing vessel and a plurality of spacing bars connecting the running lines at spaced intervals for maintaining separation of the running lines. Connecting the running lines in the intervals between the spacing bars are a plurality of branch lines, each of which carries a number of jigs. The spacing bars may also have jigs attached thereto so that a very large number of jigs are presented from but two fairly closely spaced running lines trailing the vessel.

The assemblage of running lines, spacing bars and branch lines constitute a very large trolling array which can be trailed by a small vessel having fairly short jig poles extending abeam of the vessel. Both the spacing bars and the branch lines of the array are detachably connected to the running lines so that they may be removed from the lines as the array is hauled aboard the vessel to remove the catch.

A significant feature of the array is that the spacing bars employed therein preferably have a streamlined, or teardrop cross section to stabilize the lengthy array and to reduce the drag it offers as it is drawn through the water. With each spacing bar stabilized to a smooth, straight passage through the water there is little tendency for the array to rope, or twist, and foul the numerous jigs therein.

It is also contemplated that the array of this invention be employed in conjunction with means for shearing different regions of the array to different depths beneath the surface of the sea and outwardly of the wake of the vessel into undisturbed water. For example, by shearing the trailing ends of the running lines of the array to a greater depth than the region of the array adjacent the vessel, a deep layer of sea can be swept by the array thereby enhancing the chance of catching fish with the array.

A further technique for utilizing the array of this invention involves setting, or deploying a second set of running lines to the opposite side of the vessel from which a previously set pair of lines are being hauled in to remove the catch. As the first set lines are brought aboard the spacing bars and branch lines removed therefrom are connected to the pair of running lines being set. In this manner, as a length of one array is hauled aboard, an equal length of a newly assembled array is deployed so there is always the same array area set for fishing. This operation also has the advantage that it keeps the deck and working cockpit of the vessel clear of a build up of the spacing bars and branch line apparatus of the array.

BRIEF DESCRIPTION OF THE DRAWINGS

The invention is described in greater detail hereinafter by reference to the accompanying drawings wherein:

FIG. 1 is a diagrammatic plan view of a fishing vessel equipped with this invention;

FIG. 2 is a perspective view of a spacing bar component of the trolling array of the invention, with the bar shown broken to shorten this illustration;

FIG. 3 is a perspective view of a detachable connector used in conjunction with the spacing bar of FIG. 2;

FIG. 4 is a plan view of a branch line component of the trolling array of this invention, with the line shown broken to shorten the illustration;

FIG. 5 is a plan view of a portion of the assembled trolling array;

FIG. 6 is a diagrammatic plan view of the trolling array under tow by the fishing vessel of FIG. 1, with portions broken to shorten the illustration;

FIG. 7 is an elevational view of the array shown in FIG. 6;

FIG. 8 is a perspective view of certain components of the array at the trailing end thereof;

FIG. 9 is an elevational view of a paravane component of the assemblage shown in FIG. 8;

FIG. 10 is a top plan view of a portion of a spacing bar of the trolling array utilized at the leading end of the array;

FIG. 11 is an elevational end view of the spacing bar shown in FIG. 10; and

FIG. 12 is a perspective view of a two reel winch used in setting and hauling the trolling array of this invention.

BEST MODES FOR CARRYING OUT THE INVENTION

Referring particularly to FIG. 1, there is shown in plan the outline of a trolling vessel equipped with the apparatus of this invention and adapted to carry out the method of the invention. It should be pointed out initially that, although the vessel is intended to be employed in fishing for pelagic species of fish, such as tuna, salmon, and mackeral, which travel in schools at sea often far from land, the size of the vessel is purposely kept small in order to reduce the amount of power required to propel it through the water. A typical trolling vessel employing the method and apparatus of this invention will have a length of some twenty feet, a beam of approximately eight feet and will be propelled by a single diesel engine from twenty to fifty horsepower. Obviously, a vessel of this size is not capable of navigating long distances across the open sea, so it is intended to be used in a fleet operation with a number of small trolling vessels being associated with a mother ship capable of hauling the trolling vessels on board.

It is contemplated that the mother ship be equipped with crew's sleeping quarters and refrigerated fish storage facilities so that the individual trolling vessels need provide only minimum comfort facilities and minimum catch storage. Because the construction of the mother vessel and the crew facility and the storage details of the trolling vessel are not essential to an understanding of this invention, these are neither shown nor described in any greater detail herein.

The trolling vessel is indicated generally by reference numeral 11 and is adapted to tow a jig array indicated generally by the reference numeral 12 from one side or the other, or from both sides thereof and astern of the vessel.

The gear carried by vessel 11 for positioning the array, or arrays, 12 includes a pair of jig poles, or beams 13, pivotally mounted on the deck of the vessel at 14 and held in their extended positions abeam of the vessel by spreaders 16 connected to the jig poles and the mast 17 of the vessel. Jig poles 13 may be further stabilized, if desired, by pole vangs 18.

Each jig array 12 has as a principal component thereof a pair of running lines 19 and 20. Numeral 19 designates the outboard running line whereas numeral 20 designates the inboard running line. Each pair of running lines 19, 20 are stored on reels or drums 22 on a pair of powered winches 23.

Each outboard running line 19 of each jig array 12 passes from its respective drum 22 through a sheave 24 carried on a spreader 16 and thence through another sheave 26 carried at the outboard end of jig pole 13 and is thereafter trailed aft and outboard of the vessel 11. The inner running lines 20 of each array are adapted to pass directly from their respective drums through fairleads 27 at the stern of the vessel.

Each pair of running lines 19 and 20 are wound on their reels 22 in such a manner that each line of the pair is let out simultaneously to set an array 12 or hauled in simultaneously to haul in an array depending upon the direction in which the winch 23 rotates the reels 22 (see FIG. 12).

The preferred spacing for the two lines of each pair of running lines 19 and 20 for the size vessel mentioned above is approximately 12 feet and the jig poles 13 are constructed to provide this initial spacing at the stern of the vessel 11.

In a commercial fishing operation it is desirable that the jig array 12 have as many jigs, or hooks, or lures, as possible in order to enhance the opportunity for catching large numbers of fish. In prior conventional trolling practice wherein individual jig lines are trolled there is a practical limit as to how long the lines may be and how many jigs they may carry because of the possibility of the lines becoming fouled with each other. This is particularly true in a trolling operation such as is envisioned by this invention wherein the running lines 19, 20 are closely spaced because of the relatively small size of the trolling vessel. In accordance with this invention, the size of the jig array 12 is greatly increased for fishing by providing an extremely long length for the array, i.e., of the order of 1,000 feet or more. This lengthy array 12 is stabilized and appropriate spacing maintained between the individual running lines of each pair 19, 20 by spacing means forming a part of the jig array. This spacing means comprises spacing and fishing bars 28 adapted to be detachably connected to the running lines 19 and 20.

A typical spacing bar 28 is illustrated in greater detail in FIG. 2 and comprises a rod or tube 29 having a streamline cover 31 thereover. The purpose of the streamline cover 31 is to cause the spacing bar 28 to move through water in a stable fashion so as to resist any tendency for the array 12 to twist or rope and to reduce the drag of the bar.

Each end of spacing bar 28 is equipped with a detachable connector 32. This connector 32 may take the form of a conventional snap fastener commonly employed in the fishing industry and illustrated in FIG. 3. As the ends of the spacing bars 28 are attached to the running lines 19 and 20, the bars 28 are maintained in proper position on the running lines by micropress sleeve stops 33 which are affixed to running lines 19 and 20 at predetermined intervals.

Each spacing and fishing bar 28 also preferably carries a plurality of jigs, or lured hooks, 34, which are attached by means of leaders 35 and swivels 36 to the trailing edge of the bars. Spacing between leaders 35 for the jigs 34 can be as little as one foot, so that each spacing bar 28 is capable of having some 12 jigs carried thereby. The separation of running lines 19 and 20 and stabilization of the jig array 12 can be accomplished by spacing the spacing bars along the running lines 19 and 20 at intervals of approximately 80 feet. The space between the spacing bars 28 is occupied by a multiplicity of jigs 34 which are carried by branch lines 37 (see FIG. 4). The branch lines 37 are also approximately 12 feet in length, have detachable connectors 32 at their ends for connection to running lines 19 and 20, and are adapted to carry jigs 34 by means of leaders 35 and swivels 36. Branch lines 37 are preferably connected to running lines 19 and 20 at regular intervals by means of connectors 32 and stops 33 on the lines. With 20 feet spacing between adjacent branch lines 37, three such lines can be placed in the space between the closest spacing bars 28. (See FIG. 5).

The detachable connections between the spacing bars 28 and running lines 19 and the detachable connections between the branch lines 37 and the running lines 19 and 20 enables the array 12 to be assembled as the running lines 19 and 20 are deployed to set the array. In other words, the winch 23 is operated to pay out a like length of the two running lines 19 and 20 of a pair of lines, the winch is stopped, and either a spacing bar 28 or a branch line 37 is connected to the pair of running lines as is dictated by the intended configuration of the array. Preferably, as mentioned previously, several branch lines 37 are interposed between spacing bars 28. To facilitate connecting the outboard ends of the spacing bars 28 and branch lines 37 to the outboard running line 19, the gear may include a haul-in line 38 (see FIG. 1) having a block 39 at the outboard end thereof through which running line 19 passes. Running line 19 can be hauled close to the gunwale of the vessel 11 by means of haul-in line 38 which can be secured to a cleat 41 to hold a portion of running line 19 close to the vessel until either a spacing bar or branch line 37 has been attached thereto. Powered winches (not shown) may be provided to manipulate the haul-in lines 38.

For trolling on or near the surface of the sea, an array 12 constructed solely of spacing bars and branch lines 37 affixed to a pair of running lines 19 and 20 can be operated quite satisfactorily. As the fish are attracted to and caught by the jigs 34 and the array begins to load up with a catch of fish, the array is hauled in and the catch removed. As each branch line 37 or spacing bar 28 approaches the stern of the vessel, the catch thereon is removed and then the branch line or the spacing bar is itself detached from the running lines. It is contemplated, in accordance with the operating method of this invention, that as one array 12 is hauled in from one side of the vessel 11 another similar array is set as the other pair of running lines 19 and 20 are deployed. The spacing bars 28 and branch lines 37 removed from the array being hauled in are transferred to and become a part of the new array being assembled and set astern of the vessel on the other side. It is thus possible to maintain essentially a constant area of jig array 12 in the water available for catching fish as the catch is removed from one previously set jig array. This mode of operation greatly enhances, again, the opportunity of catching large quantities of fish. This is particularly important with schooling fish, such as tuna, where it is necessary to endeavor to catch large quantities of fish in fairly short periods of time before the school is lost or it is dispersed.

In trolling, it is often desirable to have the jig array 12 displaced outside the wake of the trolling vessel 11 because the disturbed water in the wake tends to frighten fish and drive them away. It is also frequently desirable to have the array traverse not just a surface region of the sea but pass through a region of water of substantial depth, as much as 700–800 ft. below the surface of the sea. In accordance with this invention, means are provided for shearing the trailing end of the jig array 12 outwardly of the wake of the vessel and for shearing portions of the array to controlled depths beneath the surface of the sea. The gear used for this purpose is illustrated in FIGS. 6 through 11. The shearing means for the trailing ends of the array 12 includes an end bar 42 having end plates 43 which are provided with openings in their forward regions to receive shackles 44 attached to the trailing ends of running lines 19 and 20. FIG. 8 illustrates the end bar 42 for a port side array 12. End bar 42 preferably has a streamline cross section similar to the cross section of the other spacing bars 28 and may, additionally have a plurality of upstanding vanes 46 disposed at an angle to the direction of travel of the bar 42 through the water to impart to the bar a force moving the bar away from the wake of the vessel. For the port side array end bar 42 shown in FIG. 8, the vanes 46 are disposed to create forces as the vane moves through the water tending to move the bar to the left.

The shearing means operating in conjunction with end bar 42 also preferably includes a paravane 47 which is connected by means of shackles 45 and a swivel joint 48 to the outboard or port, end plate 43 on end bar 42. An identical paravane (not shown) may, if desired, be attached to the inboard end plate 43.

Paravane 47 of the shearing means includes a wing-like main body 49 and an upwardly extending fin 50 having a rudder-like offset 51 at the rear thereof. In addition, the trailing edge 52 of the paravane wing 49 may be deflected upwardly and downwardly on opposite sides of the wing (see FIG. 9) to guide the paravane through the water in a manner to apply shearing forces both transversely and downwardly to end bar 42. In this manner, the trailing end of array 12 can be caused to move away from the vessel and downwardly into the water to a substantial depth which is controlled by a depth line 53 which is attached to end plates 43 of end bar 42 and to a float, or sled, 54 adapted to float on the surface of the water as the array 12 is sheared downwardly. The manner in which the depth line 53 operates is best illustrated in FIGS. 6, 7 and 8. If desired, sled 54 may also be equipped with adjustable rudders 55 to cause the sled to also shear the trailing end of array 12 outwardly from the wake of the vessel. (See FIG. 8). It can be readily understood that by preselecting the length of the depth line 53 and the trolling speed of vessel 11, it is possible to accurately position the end bar 42 at some predetermined depth beneath the surface of the sea. Generally speaking, faster towing speeds dictate the use of longer depth lines 53 to cause the end bar 42 to be positioned at the same depth by paravanes 47.

Under certain fishing conditions, it is desirable to also shear the forward region of the array 12 to some predetermined depth, as when a layer of warm water overlies a school of fish so that none of the fish are to be caught near the surface. FIGS. 6 and 7 also indicate the condition of the array 12 when it is set for this type of trolling. The shearing means for the forward region of the array 12 includes paravanes 47, a depth line 53, and a sled 54 similar to those employed to shear the trailing ends of the array to its desired position. The paravanes 47 and depth line 53 are attached to a lead bar 56 (see FIG. 10) which is provided with end plates 57 having openings for receiving means for securing the paravanes and depth line to the lead bar. The lead bar 56 is preferably provided with connectors 32 by which the bar may be attached to running lines 19 and 20 and has a streamline configuration like the spacing bars 28. (See FIG. 11).

In most fishing endeavors it is desirable for the spacer bars 28 and the branch lines 37 to be generally at right angles to the direction of travel of the trolling vessel 11 and of the running lines 19 and 20. To achieve this condition, it is sometimes necessary to advance one of the lines 19 or 20 with respect to the other to properly position the micropress sleeve stops 33 thereon in position to, in turn, position spacing bars 28 and branch lines 37. This relative adjustment of the linear positions of the running lines 19 and 20 is achieved by means of gear shown in FIG. 1 and comprises an angle adjustment line 58 having a block 59 on one end thereof through which the outboard running line 19 passes. The other end of line 58 is secured to a cleat 61 on the deck of vessel 11 in such a manner that the length of the line 58 can be adjusted by the crew. It can be appreciated that by shortening line 58 outboard running line 19 is required to traverse a larger distance between blocks 24 and 26 on the jig pole gear with the result that the outboard running line 19 is shifted forward with respect to the inboard running line 20. Conversely, lengthening angle adjustment line 58 allows outboard running line 19 to move rearwardly with reference to inboard running line 20. Thus, it is possible to skew the array 12 by adjusting the relative position of the outward running line 19 with respect to the inboard running line 20. A slight skewing of the spacing bars 28 and end bar 42 can further assist in shearing the array 12 away from the wake of the vessel.

From the foregoing it should be evident that this invention makes it possible to catch large quantities of fish using small, economical vessels; vessels that are inexpensive to construct and inexpensive to operate compared to the large ocean going seining ships commonly in use to catch tuna and other pelagic fish today. There are other advantages, too, to the fishing method and apparatus of this invention. One advantage is that no mammals, such as the porpoise, are taken or killed using this invention. In seining many mammals are caught and drowned in the nets used with that method. With the array of this invention, even if a porpoise does strike one of the lures the leader for that lure will undoubtedly break under the weight of the mammal and it will be free. A second advantage over seining is that the long array of this invention can catch many, but not all the fish in a school. Consequently, a number of fish in each school remain in the sea to repopulate.

What is claimed is:

1. A trolling array comprising a pair of running lines adapted to be towed astern of a moving fishing vessel, spacing bars connecting said running lines at spaced intervals for maintaining separation between said running lines, means detachably connecting said bars to said running lines to permit the bars to be separated from the running lines when the latter are hauled aboard the vessel, and shearing means for controlling the position of the array in the water as the array is towed through the water.

2. The trolling array of claim 1 further comprising a plurality of branch lines detachably connecting said running lines, and a plurality of jigs on each of said branch lines.

3. The trolling array of claim 2 wherein said shearing means comprise means associated with a spacing bar at the trailing ends of said running lines for shearing the array outwardly of the wake of the towing vessel.

4. The trolling array of claim 3 in which said shearing means also displaces the trailing ends of said running line beneath the surface of the water.

5. Trolling apparatus comprising a moving fishing vessel, a first pair of running lines deployed to one side of and astern of the vessel, a plurality of spacing bars maintaining separation between said running lines, means detachably connecting said spacing bars to said first pair of running lines, a second pair of running lines adapted to be set to the other side of and astern of the vessel, and means for hauling in said first pair of running lines and for simultaneously deploying said second pair of running lines, said connecting means permitting said spacing bars to be transfered from said first pair of running lines to said second pair of running lines in the vicinity of said vessel as said first pair of running lines are being hauled in and said second pair of running lines are being deployed.

6. The trolling apparatus of claim 5 including means for shearing the trailing ends of said first and second pairs of running lines outwardly of the wake of the vessel.

7. The trolling apparatus of claim 5 including means for shearing the trailing ends of said first pair of running lines beneath the surface of the water.

8. The trolling apparatus of claim 5 wherein said spacing bars have cross sections shaped to cause the bars to move through the water in stable fashion to stabilize the bars and running lines as they are towed through the water.

9. The trolling apparatus of claim 5 further comprising a plurality of branch lines detachably connected to said first pair of running lines, said branch lines having a plurality of jigs attached thereto and also being transferable from said first pair of running lines to said second pair of running lines.

10. A trolling array comprising a pair of running lines adapted to be trailed astern of a vessel, a plurality of spacing bars connecting said running lines at spaced intervals for maintaining separation of said running lines, first means associated with a rear spacing bar near the trailing ends of said running lines for shearing that spacing bar to a predetermined depth beneath the surface of the water, and second means associated with another spacing bar forward of said rear spacing bar for shearing said other spacing bar to a predetermined depth beneath the surface of the water.

11. The trolling array of claim 10 further comprising a plurality of branch lines connecting said running lines between said rear spacing bar and said other spacing bar, said branch lines having a plurality of jigs attached thereto.

12. The array of claim 10 wherein said first and second shearing means comprise paravanes.

13. A method of trolling comprising setting a first pair of running lines to one side and astern of a vessel, detachably securing a plurality of spacing bars at spaced intervals along said running lines to maintain separation between the lines of the first pair, detachably securing a plurality of branch lines to the running lines of said first pair, said branch lines having jigs attached thereto, hauling in said first pair of running lines while setting a second pair of running lines from the other side of the vessel, removing fish from the jigs as they approach the vessel and transferring branch lines and spacing bars from said first pair of running lines to said second pair of running lines.

14. The method of claim 13 including shearing the trailing ends of said first and second pairs of running lines outwardly of the wake of the vessel.

15. The method of claim 14 including shearing the trailing ends of at least one of said pairs of running lines to a predetermined depth.

16. The method of claim 14 including shearing a forward region of at least one of said pairs of running lines to a predetermined depth.

17. The method of claim 15 including shearing a forward region of said one of said pairs of running lines to a predetermined depth.

18. A method of trolling comprising setting a pair of running lines to one side and astern of a vessel, detachably securing a plurality of spacing bars at spaced intervals along said running lines to maintain separation between the lines, detachably securing a plurality of branch lines to the running lines, said branch lines having jigs attached thereto, shearing the trailing ends of said running lines outwardly of the wake of the vessel, hauling in said running lines, removing fish from the jigs as they approach the vessel and detaching said branch lines and spacing bars from the running lines as they approach the vessel.

19. The method of claim 18 including shearing the trailing ends of said running lines to a predetermined depth.

20. The method of claim 19 including shearing a forward region of said running lines to a predetermined depth.

21. The method of claim 13 performed simultaneously in association with at least two fishing vessels which are small enough to be hauled aboard a mother vessel.

22. The method of claim 18 performed simultaneously in association with at least two fishing vessels which are small enough to be hauled aboard a mother vessel.

* * * * *